No. 715,780. Patented Dec. 16, 1902.
W. FRIEDRICH.
WHEEL RIM.
(Application filed May 26, 1902.)

(No Model.)

Witnesses:

Inventor:
W. Friedrich.
by J. M. Carschel
his Attorney

UNITED STATES PATENT OFFICE.

WILHELM FRIEDRICH, OF RIXDORF, GERMANY.

WHEEL-RIM.

SPECIFICATION forming part of Letters Patent No. 715,780, dated December 16, 1902.

Application filed May 26, 1902. Serial No. 109,066. (No model.)

*To all whom it may concern:*

Be it known that I, WILHELM FRIEDRICH, manufacturer, a subject of the Emperor of Germany, residing at 231 Herrmannstrasse, Rixdorf, near Berlin, in the Empire of Germany, have invented certain new and useful Improvements in Wheel-Rims, of which the following is a specification.

At the present day it is the practice to manufacture wheels for cycles and other vehicles with hollow or tubular rims formed from sheet metal with a groove in the outer surface to receive the rubber tire. It is to this class of rims that the present invention relates; but its chief object is to construct a rim in such a manner that the putting on and removing of the tire will be greatly facilitated. In order to accomplish this object, my rims are constructed of an outer and an inner ring, both of conical or tapering cross-section, and they are fastened together in the manner hereinafter described.

Figure 1:
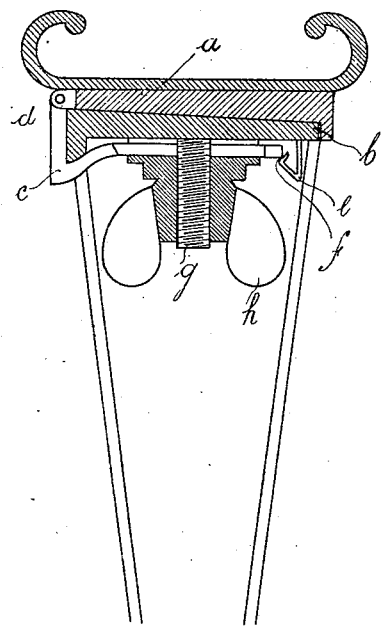
Figure 2:
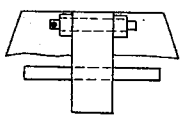

In the accompanying drawings, Figure 1 is a view showing in cross-section my rim in its preferred form. Fig. 2 is a partial side view of the rim represented in Fig. 1.

Of the two felly-rings $a$ and $b$, of conical or tapering cross-section and arranged one above the other, the outer one, $a$, which carries the pneumatic tire, is provided with one or more levers $c$, the latter being laterally and movably arranged on said ring $a$ and preferably bent at right angles. Corresponding projections $d$ are provided on the inner side and preferably on or near the edge of the inner felly-ring, which projections engage with the levers $c$ on the ends of the latter, being pressed against the hook-springs $e$, attached to the smaller or inner felly-ring. On further pressing upon the levers $c$ the springs $e$ are pressed sidewise and the hooks thereof finally engage with the ends of the said levers, whereby the latter are kept in position. The said levers thus serve to connect the two felly-rings with one another; but in order to fit and keep them close upon one another the inner ring is fitted with a screw-bolt $g$, which on turning down the levers $c$ enters into a corresponding hole provided in the latter. On screwing down a thumb-screw $h$, fitted onto the screw-bolt $g$, the levers $c$ are firmly pressed against the inner felly-ring $h$, with the result that both rings $a$ and $b$ are solidly joined together.

In order to exchange the pneumatic tire of the wheel, it is only necessary to loosen the said thumb-screw by hand and remove the same from the screw-bolt $g$. After bending back the hook-springs $e$ the levers $c$ are again free and the outer felly-rim, which carries the pneumatic tire, may then be easily removed. For the purpose of again putting on the pneumatic tire the felly-ring $a$ is placed over the inner ring $b$ and the manipulation described above again repeated.

What I claim as my invention, and desire to secure by Letters Patent of the United States, is—

1. A wheel-rim consisting of an outer and an inner felly-ring of conical cross-section, the outer ring being provided with one or more levers adapted to engage with corresponding radial projections arranged on the inner ring for the purpose of joining the two rings together.

2. A wheel-rim consisting of an outer and an inner ring of conical section, the outer ring being provided with one or more levers, which latter are bent at right angles and adapted to engage with corresponding radial projections arranged on the inner ring, as and for the purpose set forth.

3. In combination with a wheel-rim consisting of an outer and an inner ring of conical cross-section and having one or more levers attached to the outer ring, which are bent at right angles and adapted to engage with corresponding radial projections arranged on the inner ring, a spring hook or hooks on the inner ring adapted to keep the levers in place when the latter are turned down, as and for the purpose described.

4. In a wheel-rim consisting of an outer and an inner ring of conical cross-section and having one or more levers attached to the outer ring, which are bent at right angles and adapted to engage with corresponding radial projections arranged on the inner ring, and having also a spring hook or hooks adapted to keep the levers in place, a screw-bolt fitted into the inner ring and adapted to enter a corresponding hole of the levers as soon as the latter are turned down, as and for the purpose set forth.

5. In combination with a wheel-rim consisting of an outer and an inner ring of conical cross-section and having one or more levers attached to the outer ring which are bent at right angles and adapted to engage with corresponding radial projections arranged on the inner ring and having also a spring hook or hooks on the inner ring adapted to keep the levers in position, and a screw-bolt fitted into the inner ring and adapted to enter a corresponding hole of the levers as soon as the latter are turned down, a thumb-screw fitted onto the screw-bolt and adapted to be screwed down and thereby effect a solid joining of the outer and inner ring, substantially as shown and described.

In testimony whereof I have signed my name to this specification in the presence of two subscribing witnesses.

WILHELM FRIEDRICH.

Witnesses:
HENRY HASPER,
WOLDEMAR HAUPT.